United States Patent
Yu et al.

(10) Patent No.: US 8,824,758 B2
(45) Date of Patent: Sep. 2, 2014

(54) METHOD AND APPARATUS FOR ORIENTING TISSUE SAMPLES FOR COMPARISON

(71) Applicant: Sony Corporation, Tokyo (JP)

(72) Inventors: Liangyin Yu, Fremont, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/671,190

(22) Filed: Nov. 7, 2012

(65) Prior Publication Data
US 2014/0126786 A1    May 8, 2014

(51) Int. Cl.
*G06K 9/00*    (2006.01)

(52) U.S. Cl.
USPC ............................................. 382/128

(58) Field of Classification Search
None
See application file for complete search history.

(56) References Cited

U.S. PATENT DOCUMENTS

| | | | |
|---|---|---|---|
| 6,640,000 B1 * | 10/2003 | Fey et al. ............. | 382/128 |
| 6,668,082 B1 * | 12/2003 | Davison et al. ........ | 382/190 |
| 8,108,024 B2 * | 1/2012 | Carlsen et al. ........ | 600/407 |
| 2002/0085744 A1 * | 7/2002 | Domanik et al. ........ | 382/133 |
| 2009/0304244 A1 | 12/2009 | Kolatt et al. | |
| 2010/0215227 A1 * | 8/2010 | Grunkin et al. ........ | 382/128 |
| 2013/0230220 A1 * | 9/2013 | Yu et al. ............. | 382/128 |
| 2013/0243302 A1 * | 9/2013 | Liu et al. ............. | 382/133 |

OTHER PUBLICATIONS

Mosaliganti et al., "Registration and 3D Visualization of Large Microscopy Images", Computer Science and Engineering, Biomedical Informatics, Medical Imaging 2006, Proc. of SPIE vol. 6144, 61442V-1, 12 pages.

\* cited by examiner

*Primary Examiner* — Jason M Repko
*Assistant Examiner* — Shervin Nakhjavan
(74) *Attorney, Agent, or Firm* — Moser Taboada

(57) ABSTRACT

Certain aspects of an apparatus and method for orienting tissue samples for comparison may include incrementally rotating orientation of a first image by a predetermined rotation angle while maintaining orientation of a second image at a fixed angle, checking alignment of the orientation of the first image with the orientation of the second image at each predetermined rotation angle by matching a plurality of points in the first image and the second image, determining whether a predetermined rotation angle is a correct rotation angle for alignment based on a count of the plurality of points being greater than a threshold value and rotating to the next predetermined rotation angle when the count of the plurality of points is less than or equal to a threshold value.

16 Claims, 4 Drawing Sheets

METHOD AND APPARATUS FOR ORIENTING TISSUE SAMPLES FOR COMPARISON

CROSS-REFERENCE TO RELATED APPLICATIONS/INCORPORATION BY REFERENCE

This application makes reference to:
Commonly assigned U.S. patent application Ser. No. 13/671,143 filed on Nov. 7, 2012 and commonly assigned U.S. patent application Ser. No. 13/410,960 filed on Mar. 2, 2012.

Each of the above referenced applications is hereby incorporated herein by reference in its entirety.

FIELD

Certain embodiments of the disclosure relate to pathology imaging. More specifically, certain embodiments of the disclosure relate to a method and apparatus for orienting tissue samples for image comparison.

BACKGROUND

Histology is the study of the microscopic anatomy of tissues and is essential in diagnosing disease, developing medicine and many other fields. In histology, thin slices of tissue samples, typically adjacent samples, are examined and compared under a light microscope or electron microscope. Often, however, a slide might contain the tissue sample in any portion of the slide and the slide may be oriented in different ways due to variable layouts of different digital pathology systems, causing difficulty in accurate location of the target area on a slide. When different slices from the tissue sample are prepared separately for staining by different technicians, the orientation of the slices is often altered in arbitrary ways. Manual estimation and manual reorientation must be performed by pathology analysts to properly compare adjacent tissue slices, often resulting in analyst error and inaccurate results.

Therefore there is a need in the art for a method and apparatus for orienting tissue samples for image comparison in digital pathology.

Further limitations and disadvantages of conventional and traditional approaches will become apparent to one of skill in the art, through comparison of such systems with some aspects of the present disclosure as set forth in the remainder of the present application with reference to the drawings.

SUMMARY

An apparatus and/or method is provided for orienting tissue samples for image comparison in digital pathology substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain implementations may be found in an apparatus and/or method for orienting tissue samples for image comparison. According to one embodiment, a first tissue sample image is rotated incrementally. At each rotation, the first tissue sample image is compared to a comparison image to determine a number of matching points between the two images, as discussed in the U.S. patent application Ser. No. 13/410,960 filed on Mar. 2, 2012, entitled "Automatic pathological image alignment and view synchronization for stain images." If the number of matching points is less than a particular threshold value, the first time sample image is incrementally rotated to a next predetermined rotation angle. The tissue sample image is incrementally rotated until the number of matching points between the first tissue sample image and the comparison image is above a predetermined threshold value, at which point in time the two images will be considered aligned.

Figure 1:
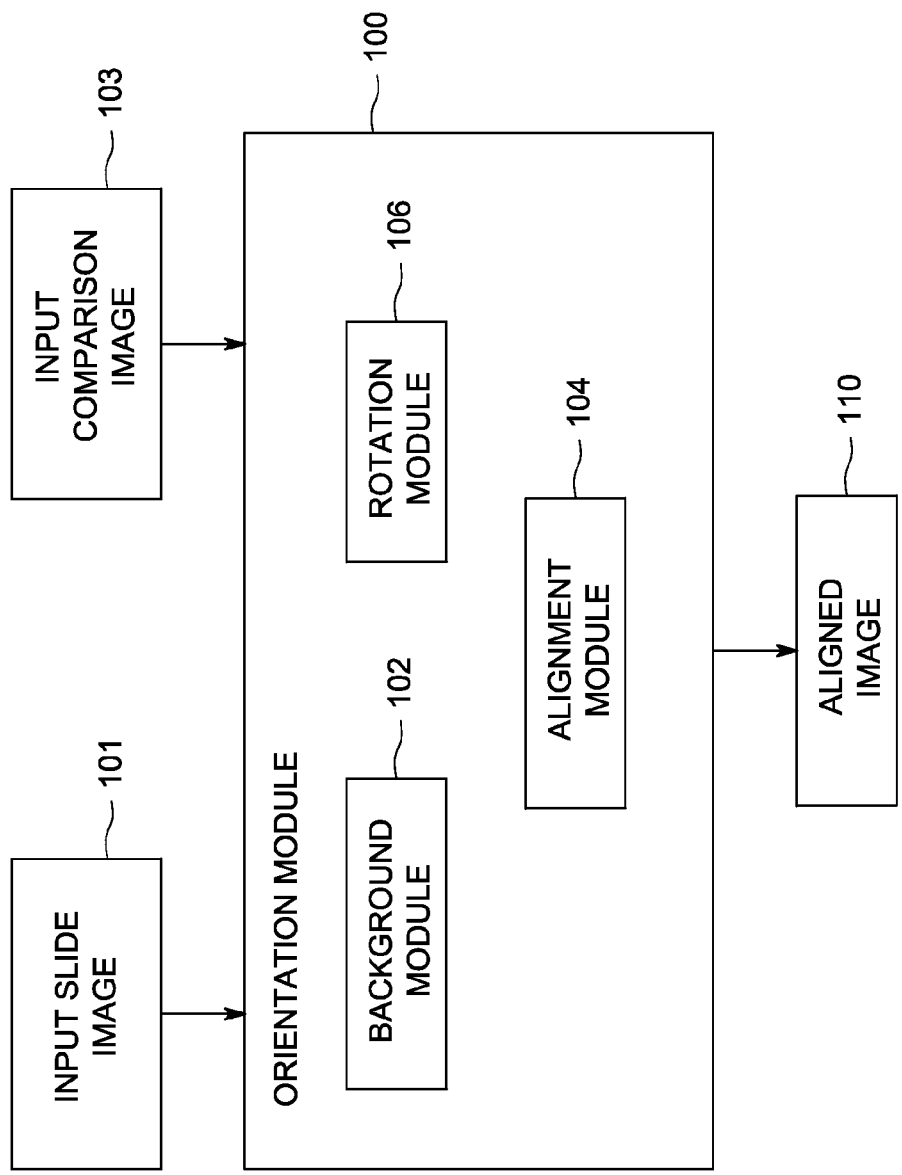
FIG. 1 is a block diagram illustrating an orientation module in accordance with an embodiment of the disclosure.

FIG. 1 is a block diagram illustrating an orientation module 100 in accordance with an embodiment of the disclosure. The orientation module 100 comprises a background module 102, an alignment module 104, and a rotation module 106. The identification module 100 takes an input slide image 101 and an input comparison image 103 as input. According to some embodiments, the input slide image 101 is a digital pathology image which is stained with one or more various color dyes to enhance cellular visibility. The input comparison image 103 is also a digital pathology image from a different slide source that may also be stained with one or more various color dyes.

In one embodiment, the input slide image 101 may be an Immunohistochemistry (IHC) stained image. IHC refers to the process of detecting antigens (e.g., proteins) in cells of a tissue section by exploiting the principle of antibodies binding specifically to antigens in biological tissues. According to one embodiment, the input comparison image 103 is a Hematoxylin and eosin (H&E) stained image. The H&E staining method involves application of hemalum, which is a complex formed from aluminum ions and oxidized haematoxylin. This colors the nuclei of cells (and a few other objects, such as keratohyalin granules) blue. The nuclear staining is followed by counterstaining with an aqueous or alcoholic solution of eosin Y, which colors other structures, such as eosinophilic structures, in various shades of red, pink and orange The input slide image 101 is first divided by the background module 102 into a background and a foreground using estimation techniques discussed in U.S. patent application Ser. No. 13/410,960 filed on Mar. 2, 2012. Then, the input image 101 is rotated by the rotation module 106 to a next predetermined angle. According to one embodiment, the rotational module 106 rotates the input image 101 by ten degrees in a negative or positive direction to the next predetermined rotation angle Θ. In other embodiments, other predetermined angle increments are utilized.

The alignment module 104 performs point matching alignment between the input slide image 101 and the input comparison image 103 as described in U.S. patent application Ser.

No. 13/410,960 filed on Mar. 2, 2012. The alignment module 104 first performs segmentation on the input image 101, by partitioning the input region into sub-regions so that within each region there is a homogeneous distribution of image contrast, also discussed in U.S. patent application Ser. No. 13/410,960 filed on Mar. 2, 2012. Structure-centered image partitioning is performed on the comparison image 103. Then, key-points are generated for the segmented image 101 and the partitioned image 103. Next, incremental cross matching and integration is performed with respect to both images 101 and 103. Filtering, as disclosed in U.S. patent application Ser. No. 13/410,960, is performed on the cross-matched points, and a number of matching points are output.

Finally, the rotation module 106 determines whether the current rotation has aligned the input image 101 and the input comparison image 103. According to one embodiment, if the amount of matching points exceeds forty, the rotation angle Θ is determined to be the correct alignment rotation angle to be used to align the input image 101 and the comparison image 103. If the number of matching points does not exceed, for example, 40, then the rotation module rotates the input image 101 by a predetermined incremental angle and the alignment module 104 is triggered to again perform point matching alignment, until an incremental angle found is determined to be the correct alignment rotation angle which results in alignment of the input image 101 and the comparison image 103.

Once the aligning rotation angle Θ is found, the orientation module 100 outputs an aligned image 110 which has corresponding matching points to the input comparison image 103 that exceed a predetermined amount.

Figure 2:
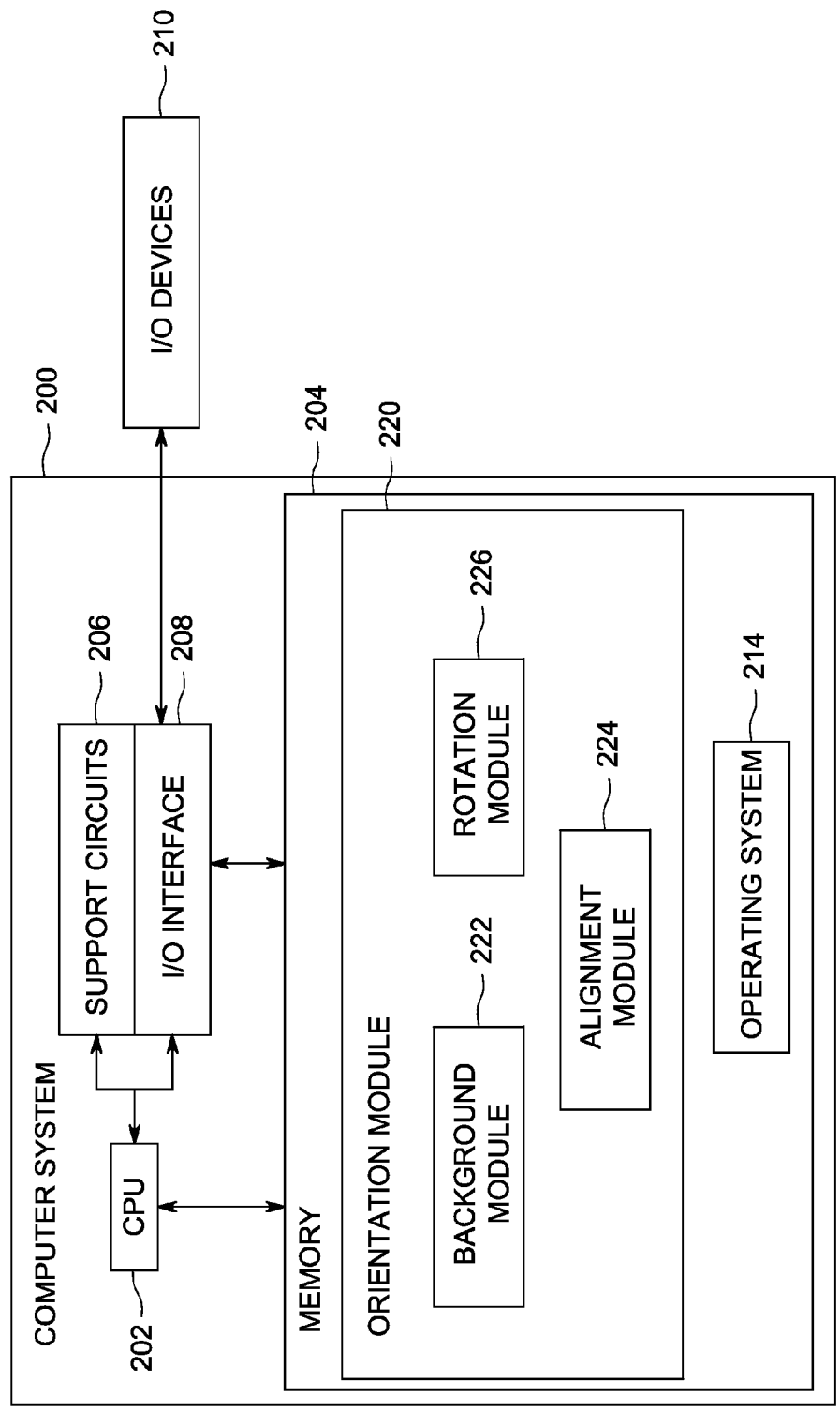
FIG. 2 is a block diagram of a computer system for implementing the orientation module 100 in accordance with embodiments of the present invention.

FIG. 2 is a block diagram of a computer system 200 for implementing the orientation module 100 in accordance with embodiments of the present invention. The computer system 200 includes a processor 202, a memory 204 and various support circuits 206. The processor 202 may include one or more microprocessors known in the art, and/or dedicated function processors such as field programmable gate arrays programmed to perform dedicated processing functions. The support circuits 206 for the processor 202 include microcontrollers, application specific integrated circuits (ASIC), cache, power supplies, clock circuits, data registers, input/output (I/O) interface 208, and the like. The I/O interface 208 may be directly coupled to the memory 204 or coupled through the supporting circuits 206. The I/O interface 208 may also be configured for communication with input devices and/or output devices 210, such as, network devices, various storage devices, mouse, keyboard, displays, sensors and the like.

The memory 204 stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprise the orientation module 220, further comprising the background module 222, the rotation module 226, and the alignment module 224.

The computer 200 may be programmed with one or more operating systems (generally referred to as operating system (OS) 214, which may include OS/2, Java VIRTUAL MACHINE, LINUX, SOLARIS, UNIX, HPUX, AIX, WINDOWS, WINDOWS95, WINDOWS98, WINDOWS NT, WINDOWS 2000, WINDOWS ME, WINDOWS XP, WINDOWS SERVER, among other known platforms. At least a portion of the operating system 214 may be disposed in the memory 204. In an exemplary embodiment, the memory 204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

Figure 3:
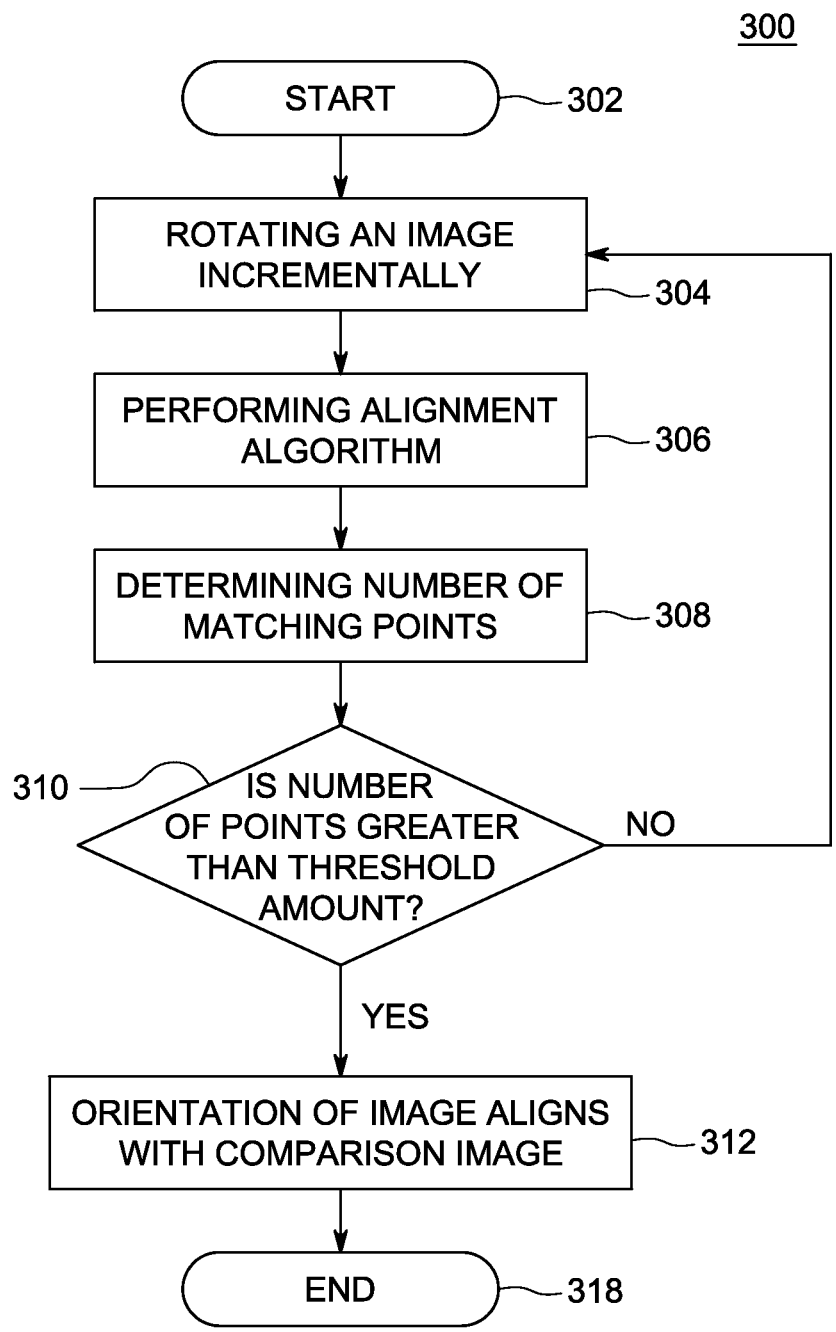
FIG. 3 is an illustration of a flow diagram for a method for orienting a digital pathology image according to exemplary embodiments of the present invention.

FIG. 3 is an illustration of a flow diagram for a method 300 for orienting a digital pathology image according to exemplary embodiments of the present invention. The method 300 is an implementation of the orientation module 100 shown in FIG. 1, implemented as the orientation module 220 in FIG. 2 as executed by the processor 202. The method begins at step 302 and proceeds to step 304.

At step 304, the rotation module 226 rotates an input image incrementally to a subsequent predetermined rotation angle. According to some embodiments, the rotation module 206 rotates the input image by +/−10.0 degree increments, though the present embodiment is not restricted to 10.0 degree increments and other rotational increments could be used.

The method then moves to step 306, where the alignment module 224 performs point matching alignment between the input image and a comparison image, as briefly discussed above. The alignment procedure is discussed in greater detail in conjunction with FIG. 4 and is also fully disclosed in the U.S. patent application Ser. No. 13/410,960 filed on Mar. 2, 2012.

At step 308, a number of matching points are determined. If at step 310 the number of matching points is greater than a threshold value, the method 030 proceeds to step 312. At step 312, the orientation of the input image 101 is verified as aligning with the comparison image 103. The method ends at step 318.

If the number of points that match is less than a threshold value, then the method 300 moves to step 304 so as to rotate the image by another increment to the next predetermined rotation angle. The method 300 then iterates until a rotation angle has been determined that results in alignment of the input image 101 and the comparison image 103, at which point the method ends at step 318.

Figure 4:
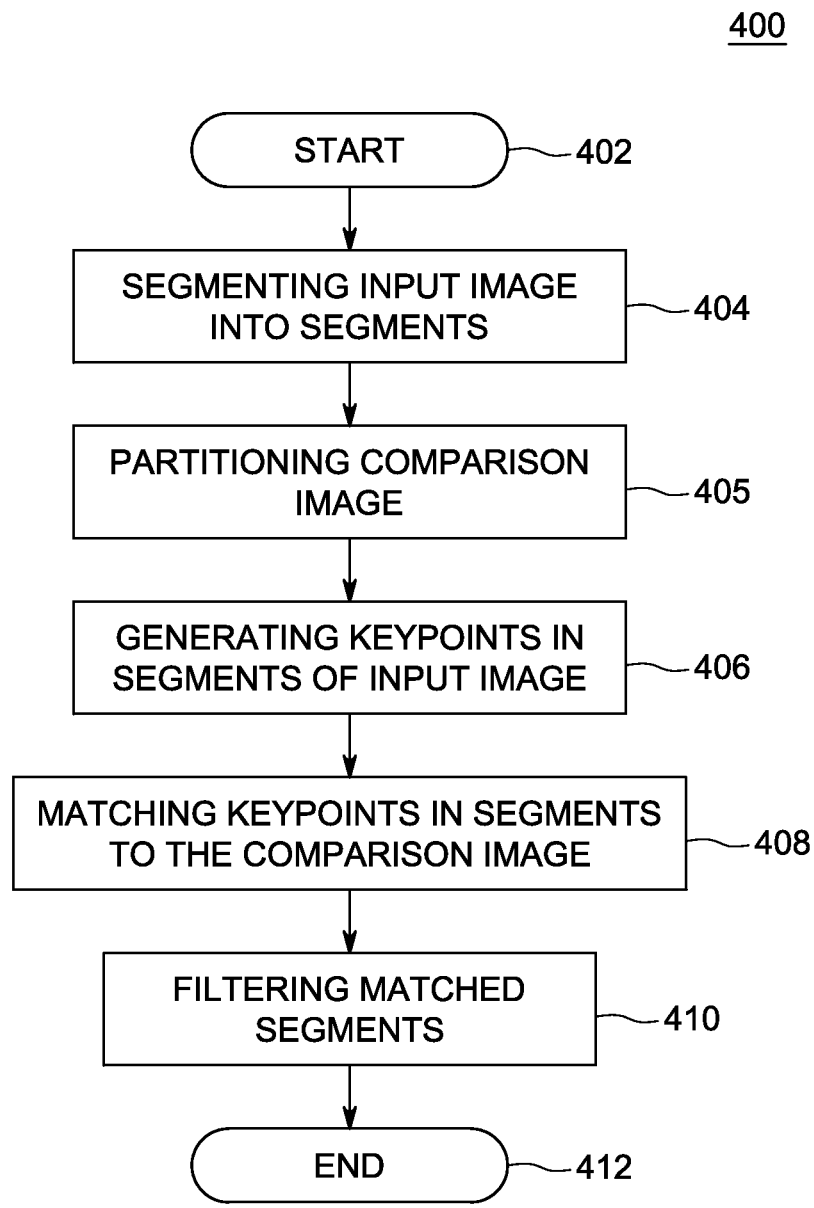
FIG. 4 is an illustration of a flow diagram for a method for orienting a digital pathology image according to exemplary embodiments of the present invention.

FIG. 4 is an illustration of a flow diagram for a method 400 for orienting a digital pathology image according to exemplary embodiments of the present invention. The method 400 is an implementation of the alignment module 104 shown in FIG. 1, implemented as the alignment module 224 in FIG. 2 as executed by the processor 202. The method begins at step 402 and proceeds to step 404.

At step 404, the alignment module 224 segments the input image into a plurality of segments. At step 405, the comparison image is partitioned by the alignment module 224. Key-points are generated for the segments of the input image in step 406. At step 408, the key-points in the segments are matched with the partitioned comparison image. Finally, at step 410, the matched segments are filtered. The method ends at step 412.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A computer-implemented method for orienting digital pathology images comprising:
   incrementally rotating orientation of a first image by a predetermined rotation angle while maintaining orientation of a second image at a fixed angle;
   checking alignment of the orientation of the first image with the orientation of the second image at each predetermined rotation angle by matching a plurality of points in the first image and the second image;
   determining whether a predetermined rotation angle is a correct rotation angle for alignment based on a count of the plurality of points being greater than a threshold value; and
   rotating to the next predetermined rotation angle when the count of the plurality of points is less than or equal to a threshold value.

2. The method of claim 1, wherein incrementally rotating comprises:
   rotating the first image by positive or negative ten degrees to a next predetermined rotation angle.

3. The method of claim 1 further comprising, before incrementally rotating the first image, estimating background in the first and second image.

4. The method of claim 1 wherein the threshold value is 40 matching points.

5. The method of claim 1 further comprising:
   receiving the first image as an immunohistochemistry (IHC) image and receiving the second image as a Hematoxylin & Eosin (H&E) image.

6. The method of claim 1, aligning the images further comprising:
   segmenting the first image into a plurality of segments;
   generating key-points in the plurality of segments;
   cross matching the plurality of segments with the second image.

7. The method of claim 6, further comprising:
   filtering the plurality of matched segments of the first image.

8. The method of claim 6, further comprising:
   partitioning the second image using a structure-centered algorithm.

9. An apparatus for orienting digital pathology images comprising a processor configured for:
   incrementally rotating a first image to a predetermined rotation angle while maintaining orientation of a second image at a fixed angle;
   checking alignment of the orientation of the first image and the second image at each predetermined rotation angle by matching a plurality of points in the first image and the second image; and
   determining whether a predetermined rotation angle is a correct rotation angle for alignment when a count of the plurality of points is greater than a threshold value and rotating to the next predetermined rotation when the count is less than or equal to a threshold value.

10. The apparatus of claim 9, wherein the processor is further configured to rotate the first image by positive or negative ten degrees to a next predetermined rotation angle.

11. The apparatus of claim 9 wherein the processor is further configured for estimating background in the first and second image before incrementally rotating the first image.

12. The apparatus of claim 9 wherein the threshold value is 40 matching points.

13. The apparatus of claim 9, wherein the apparatus receives, as input, the first image as an immunohistochemistry (IHC) image and the second image as a Hematoxylin & Eosin (H&E) image.

14. The apparatus of claim 9, the processor is further configured to:
   segment the first image into a plurality of segments;
   generate key-points in the plurality of segments;
   cross-match the plurality of segments with the second image.

15. The apparatus of claim 14, wherein the processor is further configured to filter the plurality of matched segments of the first image.

16. The apparatus of claim 14, wherein the processor is further configured to partition the second image using a structure-centered algorithm.

* * * * *